United States Patent
Sridharan et al.

(10) Patent No.: US 6,936,556 B2
(45) Date of Patent: Aug. 30, 2005

(54) DURABLE GLASS ENAMEL COMPOSITION

(75) Inventors: Srinivasan Sridharan, Strongsville, OH (US); George C. Korn, Coraopolis, PA (US); Jérôme Anquetil, Bar le Duc (FR); Robert Blonski, North Royalton, OH (US); Ivan H. Joyce, Hudson, OH (US)

(73) Assignee: Ferro Corporation, Cleveland, OH (US)

( * ) Notice: Subject to any disclaimer, the term of this patent is extended or adjusted under 35 U.S.C. 154(b) by 238 days.

(21) Appl. No.: 10/408,737

(22) Filed: Apr. 7, 2003

(65) Prior Publication Data

US 2004/0029703 A1 Feb. 12, 2004

Related U.S. Application Data

(63) Continuation-in-part of application No. 10/146,488, filed on May 15, 2002, now abandoned.

(51) Int. Cl.$^7$ .............................. C03C 8/02; C03C 8/04
(52) U.S. Cl. ........................... 501/14; 501/16; 501/17; 501/18; 501/21; 501/26; 501/65; 501/72; 501/73; 501/77; 501/78
(58) Field of Search ............................ 501/14, 16, 17, 501/18, 21, 26, 65, 72, 73, 77, 78

(56) References Cited

U.S. PATENT DOCUMENTS

| | | | |
|---|---|---|---|
| 3,927,243 A | * 12/1975 | Theisen ...................... 428/433 |
| 4,892,847 A | 1/1990 | Reinherz | |
| 5,093,285 A | * 3/1992 | Murkens ...................... 501/17 |
| 5,200,369 A | * 4/1993 | Clifford et al. ............... 501/66 |
| 5,244,848 A | * 9/1993 | Clifford et al. ............... 501/66 |
| 5,306,674 A | 4/1994 | Ruderer et al. | |
| 5,393,714 A | 2/1995 | Thometzek et al. | |
| 5,578,533 A | 11/1996 | Manabe et al. | |
| 5,725,919 A | 3/1998 | Roberts et al. | |
| 5,783,507 A | * 7/1998 | Sakoske ...................... 501/17 |
| 5,998,037 A | * 12/1999 | Sridharan et al. ........... 428/472 |
| 6,346,493 B1 | * 2/2002 | Kniajer et al. ................ 501/17 |
| 2002/0197408 A1 | * 12/2002 | Beyrle et al. ............ 427/376.2 |

* cited by examiner

*Primary Examiner*—David Sample
(74) *Attorney, Agent, or Firm*—Rankin, Hill, Porter & Clark LLP

(57) ABSTRACT

The present invention provides partially crystallizing lead-free and cadmium-free glass enamel composition that fuse at low temperatures. Glass enamel compositions according to the present invention form predominantly bismuth titanate and optionally zinc titanate crystals upon firing. Preferably, glass enamel compositions according to the invention include a glass component that includes by weight from about 11% to about 52% $SiO_2$, from 10.2% to about 40% $TiO_2$, from about 5% to about 75% $Bi_2O_3$, up to about 8% $B_2O_3$, up to about 14% BaO+SrO, and up to about 45% by weight ZnO, where the sum of $Bi_2O_3$ and ZnO comprises from about 30% to about 85% of the glass component by weight.

22 Claims, 1 Drawing Sheet

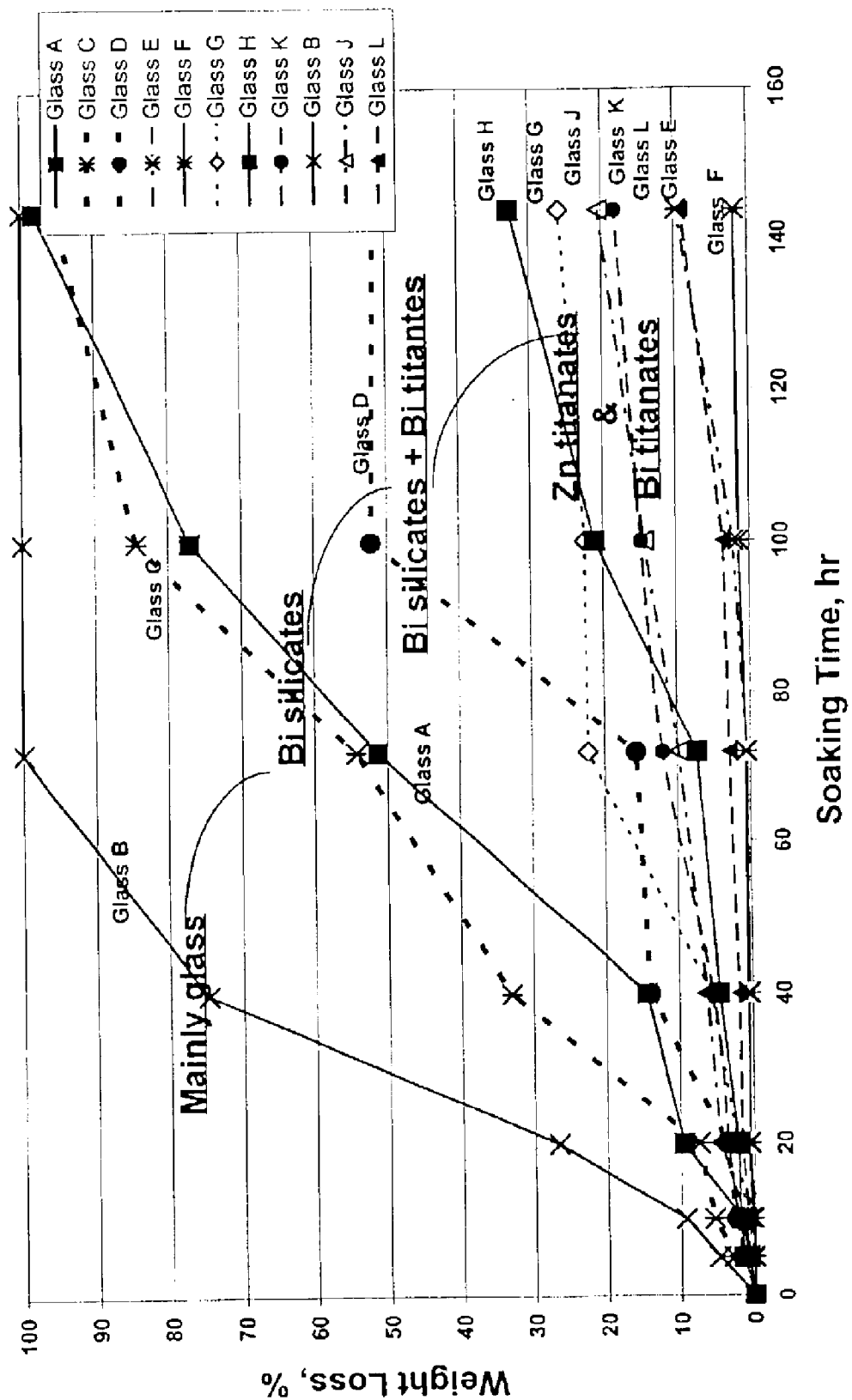

DURABLE GLASS ENAMEL COMPOSITION

CROSS-REFERENCE TO RELATED APPLICATION

This application is a continuation-in-part of application Ser. No. 10/146,488 filed May 15, 2002, now abandoned.

FIELD OF INVENTION

The present invention provides a glass enamel composition. More particularly, the present invention provides a glass enamel composition that partially crystallizes bismuth titanate and optionally zinc titanate crystals upon firing.

BACKGROUND OF THE INVENTION

Partially crystallizing glass enamel compositions that fuse at relatively low temperatures are used, for example, to form opaque dark-colored enamel bands on the outer edges of sections of automotive glass such as windshields and side and rear windows. These opaque dark-colored enamel bands, which typically vary in width from about 1.5 cm to about 15.0 cm, greatly enhance the aesthetic appearance of the sections of glass upon which they are applied and also block the transmission of sunlight through the glass to protect underlying adhesives from degradation by ultraviolet radiation. Moreover, these opaque colored enamel bands preferably have the ability to conceal silver-containing buss bars and wiring connections of rear glass defrosting systems from view from the outside of the vehicle.

As noted in Gettys et al., U.S. Pat. No. 4,882,301, glass sections for automotive applications are often produced with varying degrees of curvature as opposed to flat, planar surfaces. If a curvature is desired in a given section of glass, the glass is heated to a temperature in the vicinity of about 700° C. and then subjected to a bending or curving stress employing any number of suitable molding or pressing techniques. At or near that temperature, the section of glass can be bent as desired, and the surface of the section of glass will maintain sufficient stiffness to resist marking or defects caused by contact with the press head of the equipment employed to bend or curve the glass or the vacuum head utilized to pick up and transport the section of glass during the bending operation.

It was discovered several years ago that specially formulated glass enamel compositions could be applied to planar sections of glass and fired to form opaque dark-colored enamel bands at the same time as the bending or forming operations were performed on the section of glass. As set forth in U.S. Pat. No. 4,882,301, these glass enamel compositions had to have the ability to fuse and partially crystallize at the temperature at which a section of glass would be preheated preparatory to a bending or forming operation. It is believed that the partial crystallization of the enamel forms a dense, hard, protective layer that prevents the enamel from sticking to the press or vacuum head during the glass bending and transporting operations.

Generally speaking, prior art glass enamel systems suitable for use in such automotive applications fit within one of five broad categories or types. The first category relates to lead and/or cadmium based enamel systems that partially crystallize upon firing. Glass enamel systems such as disclosed in U.S. Pat. No. 4,882,301 are representative of this type.

The second category relates to lead-free and cadmium-free enamel systems that include crystalline seed materials that promote partial crystallization of the enamel upon firing. Glass enamel systems such as disclosed in Ruderer et al., U.S. Pat. No. 5,153,150, Ruderer et al., U.S. Pat. No. 5,208,191, Sakoske, U.S. Pat. No. 5,677,251, Sakoske et al., U.S. Pat. No. 5,714,420, Sakoske, U.S. Pat. No. 5,753,685, and Sakoske, U.S. Pat. No. 5,783,507, are representative of this type.

The third category relates to partially crystallizing lead-free and cadmium-free enamel systems that include substantial amounts of $Bi_2O_3$, but little if any ZnO. Glass enamel systems such as disclosed in Murkens, U.S. Pat. No. 5,203,902, and Manabe et al., U.S. Pat. No. 5,578,533, and Sridharan et al., U.S. Pat. No. 6,105,394, are representative of this type.

The fourth category relates to partially crystallizing lead-free and cadmium-free enamel systems that include substantial amounts of ZnO, but little $Bi_2O_3$. Glass enamel systems such as disclosed in Ruderer et al., U.S. Pat. No. 5,306,674, Anquetil et al., U.S. Pat. No. 5,350,718, Emlemdi et al., U.S. Pat. No. 5,504,045, Heitmann et al., U.S. Pat. No. 5,707,909, and Harada et al., U.S. Pat. No. 5,817,586, are representative of this type.

The fifth category relates to partially crystallizing lead-free and cadmium-free enamel systems that include both $Bi_2O_3$ and ZnO as essential components. Glass enamel systems such as disclosed in Roberts, U.S. Pat. No. 5,252,521, Ryan, U.S. Pat. No. 5,616,417, and Punchak, U.S. Pat. No. 5,629,247, are representative of this type.

Although improvements have been made in recent years, the chemical durability of known lead-free and cadmium-free glass enamel systems used in automotive glass applications has been less than desired. Therefore, a need exists for lead-free and cadmium-free enamel compositions that exhibit excellent chemical durability to acids, water, and alkalis. Such enamel compositions must be able to fuse and preferably, partially crystallize at temperatures at which sections of glass are preheated preparatory to forming operations so as not to stick to press or vacuum heads. Moreover, such enamel compositions should be effective in blocking ultraviolet radiation and in retarding the migration of silver and subsequent showing from overprinted buss bars and wiring connections of rear glass defrosting systems.

SUMMARY OF INVENTION

The present invention provides a glass enamel composition that partially crystallizes and fuses at relatively low firing temperatures. Conceptually, the glass enamel composition according to the present invention comprises an entirely new category of glass enamels in that it forms crystals predominantly of bismuth titanate and optionally of zinc titanate upon firing. Enamel layers formed using a composition according to the present invention exhibit excellent resistance to acids and other chemical agents, far surpassing the acid resistance provided by enamel layers formed using known partially crystallizing lead-free and cadmium-free glass enamel systems.

A glass enamel composition according to the invention comprises a solids portion comprising a glass component, which preferably comprises one or more glass frits. In a first preferred embodiment of the invention, the glass component comprises by weight from about 11% to about 52% $SiO_2$, from 10.2% to about 40% $TiO_2$, from about 5% to about 75% $Bi_2O_3$, up to about 45% by weight ZnO, up to about 8% $B_2O_3$, and up to about 14% BaO+SrO, where the sum of $Bi_2O_3$ and ZnO comprises about 30% to about 85% of the glass component by weight. In a second preferred embodiment of the invention, the glass component comprises by weight from about 11% to about 52% $SiO_2$, from 3.4% to about 40% $TiO_2$, from about 5% to about 75% $Bi_2O_3$, up to about 8% $B_2O_3$, up to about 14% BaO+SrO, up to about 45% by weight ZnO, and from about 0.1% to about 30% of any one or a combination of coloring oxides selected from the group consisting of $Cr_2O_3$, $Fe_2O_3$, $MnO_2$, CuO, NiO, $Co_2O_3$, and $CeO_2$, provided that the sum of the amount of $Bi_2O_3$ and ZnO in said glass component comprises about 30% to about 85% of the glass component by weight. Even though the $SiO_2$ content of the glass component is relatively low, non-silicate bismuth titanate and optional zinc titanate type crystals form and grow during firing, leaving most of the $SiO_2$ concentrated in the residual glass. This is believed to be the reason why the enamel exhibits such an excellent acid resistance.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWING

FIG. 1 is a graph showing the percent weight loss of various partially crystallizing glass enamel compositions as a function of soaking time in a 0.1 N $H_2SO_4$ solution heated to 86° C.

DETAILED DESCRIPTION OF PREFERRED EMBODIMENTS

The present invention provides partially crystallizing lead-free and cadmium-free glass enamel compositions that form residual glass and non-silicate crystals upon firing. As used throughout the instant specification in the appended claims, the phrase "lead-free and cadmium-free" means that no lead, or PbO, cadmium, or CdO, has been intentionally added to the composition, and that the composition comprises less than about 0.5% by weight PbO or CdO upon firing. A predominant portion of the non-silicate crystals are titanate crystals, preferably bismuth titanate and optionally zinc titanate. Throughout the instant specification and in the appended claims, the term "predominant portion" means more than 50% by weight of all crystals in the fired enamel. Crystal weights can be determined by conventional x-ray diffraction methods, which are known.

A glass enamel composition according to the invention preferably comprises a solids portion comprising a glass component. As used in the instant specification and the appended claims, the term "solids portion" means that portion of the glass enamel composition that remains after firing. In a first preferred embodiment of the invention, the glass component preferably comprises from about 11% to about 52% $SiO_2$, from 10.2% to about 40% $TiO_2$, from about 5% to about 75% $Bi_2O_3$, up to about 8% $B_2O_3$, up to about 14% BaO+SrO, up to about 45% by weight ZnO, provided that the sum of $Bi_2O_3$ and ZnO comprises about 30%, or about 33%, to about 85% of the glass component by weight. More preferably, the glass component according to the first embodiment of the invention comprises by weight from about 14% to about 35% $SiO_2$, from about 11% to about 35% $TiO_2$, from about 8% to about 74% $Bi_2O_3$, up to about 35% ZnO, up to about 6% $B_2O_3$, and up to about 10% BaO+SrO, provided that the sum of $Bi_2O_3$ and ZnO comprises about 33% to about 74% of the glass component by weight.

In a second embodiment of the invention, the glass component preferably comprises by weight from about 11% to about 52% $SiO_2$, from 3.4% to about 40% $TiO_2$, from about 5% to about 75% $Bi_2O_3$, up to about 8% $B_2O_3$, up to about 14% BaO+SrO, up to about 45% by weight ZnO, and from about 0.1% to about 30% of any one or a combination of coloring oxides selected from the group consisting of $Cr_2O_3$, $Fe_2O_3$, $MnO_2$, CuO, NiO, $Co_2O_3$, and $CeO_2$, provided that the sum of the amount of $Bi_2O_3$ and ZnO in said glass component comprises about 30% to about 85% of the glass component by weight. More preferably, the glass component according to the second embodiment of the invention comprises by weight from about 14% to about 35% $SiO_2$, from about 5% to about 35% $TiO_2$, from about 8% to about 74% $Bi_2O_3$, up to about 35% ZnO, up to about 6% $B_2O_3$, up to about 10% BaO+SrO, and from about 0.5% to about 25% of said coloring oxides, provided that the sum of the amount of $Bi_2O_3$ and ZnO in said glass component comprises about 33% to about 74% of the glass component by weight. The use of coloring oxides in the glass component according to the second embodiment of the invention, in addition to adjusting the color of the enamel, helps to modify the expansion of the glass and improve the durability of the fired enamel.

The glass component can further comprise a total of up to about 35% by weight, and more preferably from about 0.1% to about 30% by weight, of other optional oxides to adjust the color and other characteristics of the bismuth titanate and optional zinc titanate crystals and the residual glass upon firing. Preferably, such other optional oxides comprise the following: up to about 25%, and more preferably up to about 13%, alkali metal oxides (e.g., $Li_2O$, $Na_2O$, and $K_2O$), up to about 15%, and more preferably up to about 13%, $Al_2O_3$; a total of up to about 25%, and more preferably a total of up to about 20%, alkaline-earth metal oxides (e.g., BaO, SrO, CaO, and MgO), provided that the sum of BaO+SrO does not exceed 14% by weight, and more preferably 10% by weight of the glass component; up to about 25%, and more preferably up to about 10%, $V_2O_5$; up to about 15%, and more preferably up to about 8%, $Sb_2O_3$; a total of up to about 25%, and more preferably a total of up to about 20%, of any one or a combination of $La_2O_3$, $Y_2O_3$, $Nb_2O_5$, and $ZrO_2$; and a total of up to about 20%, and more preferably a total of up to about 15%, of any one or a combination of SnO, $In_2O_3$, and $MoO_3$. The glass component according to the first embodiment of the invention can further optionally comprise a total of up to about 30%, and more preferably a total of up to about 25%, of any one or a combination of coloring oxides selected from the group consisting of $Fe_2O_3$, $MnO_2$, $Cr_2O_3$, CuO, NiO, $Co_2O_3$, and $CeO_2$. In both embodiments of the invention, the sum of coloring oxides and all other optional oxides in the glass component will preferably not exceed about 35%, and more preferably about 30%, of the glass component by weight.

It will be appreciated that the glass component of the glass enamel composition according to the invention can comprise one glass frit, or it can comprise a mixture of several glass frits, including non-crystallizing glass frits, so as to obtain a glass component providing the overall oxide composition as previously described. A preferred embodiment comprises a glass component containing a combination of at least two glass frits, wherein the glass component comprises by weight from about 50% to about 90% of one or more first glass frits that upon firing form titanate crystals, and from about 10% to about 50% of one or more second glass frits that upon firing do not form titanate crystals, wherein the sum of the components of all glass frits present in the glass component comprises by weight from about 11% to about 52% $SiO_2$, from 3.4% to about 40% $TiO_2$, from about 5% to about 75% $Bi_2O_3$, up to about 45% ZnO, up to about 8% $B_2O_3$, up to about 14% BaO+SrO, provided that the sum of the amount of $Bi_2O_3$ and ZnO in the glass frits comprises from about 30% to about 85% of the glass component by weight. More preferably, the sum of the components of the first and second glass frits comprises by weight from about 14% to about 35% $SiO_2$, from about 5% to about 35% $TiO_2$, from about 8% to about 74% $Bi_2O_3$, up to about 6% $B_2O_3$, up to about 10% BaO+SrO, and up to about 35% by weight ZnO, provided that the sum of the amount of $Bi_2O_3$ and ZnO in the glass frits comprises from about 33% to about 74% of the glass component by weight. Furthermore, the solids portion of the glass enamel composition can further comprise one or more inorganic pigments such as, for example, copper chrome black, iron cobalt chrome black, iron nickel manganese chrome black, bismuth manganate, that can interact with the glass component to precipitate titanate crystals and/or impart coloration. These inorganic pigments are not part of the glass, but are added as inorganic pigments.

A glass enamel composition according to the present invention can be fired at a temperature of from about 485° C. to about 780° C., and more preferably from about 520° C. to about 725° C., typically in about five minutes. It will be appreciated that firing times are not per se critical, and that a range of firing schedules can be employed depending upon the substrate and thickness of the enamel layer being formed. When used in automotive glass bending applications, firing is typically conducted at about 685° C. for about five minutes.

Upon firing, a glass enamel composition according to the invention will form crystals that predominantly comprise bismuth titanates, and optionally zinc titanates. It will be appreciated that the proportional amount of bismuth titanates and/or zinc titanates in the fired enamel will depend, in large part, upon the amount of $Bi_2O_3$ and/or ZnO present in the glass component at the time of firing. In addition to the predominant bismuth titanate and optional zinc titanate crystals, lesser amounts of other crystal forms (e.g., transition metal titanates, bismuth silicate, zinc silicate, bismuth borate, zinc borate) may also be formed upon firing, if the conditions are suitable.

Depending upon the composition of the glass component, various different types of titanate crystals can be formed upon firing. For example, when the glass component comprises appropriate amounts of $Bi_2O_3$, $TiO_2$, and $V_2O_5$, orthorhombic bismuth-vanadium titanate crystals ($6.5Bi_2O_3.2.5V_2O_5.TiO_2$) may be formed upon firing. In the absence of $V_2O_5$, cubic bismuth titanate crystals ($Bi_2O_3.2TiO_2$), orthorhombic bismuth titanate crystals ($2Bi_2O_3.3TiO_2$), or a combination of both cubic and orthorhombic bismuth titanate crystals may be formed. Moreover, when the glass component contains appropriate amounts of ZnO, hexagonal zinc titanate ($ZnO.TiO_2$) and/or cubic zinc titanate crystals ($2ZnO.3TiO_2$) may be formed in addition to bismuth titanate crystals. It will be appreciated that the solids portion of the glass enamel composition according to the invention can further comprise seed materials (e.g., bismuth titanates etc.) to promote the rapid formation of titanate crystals upon firing.

An enamel layer formed using a glass enamel composition according to the present invention far surpasses the acid resistance of enamel layers formed using known partially crystallizing lead-free and cadmium-free glass enamels. Without being bound to a particular theory, applicants speculate that as the predominant titanate crystals form and grow during firing, $TiO_2$ and $Bi_2O_3$ and/or ZnO are depleted from the residual glass, but $SiO_2$ is not. As the titanate crystals grow, the relative concentration of $SiO_2$ in the residual glass surrounding the crystals increases over the $SiO_2$ content of the original glass. Generally speaking, a residual glass that is rich in $SiO_2$ is substantially more resistant to chemical attack than a residual glass that has been depleted of $SiO_2$ due to the formation of silicate crystals, such as is the case with known partially crystallizing lead-free and cadmium-free glass enamel systems.

In addition to the glass component, the solids portion of a glass enamel composition according to the present invention may further comprise one or more inorganic pigments. As noted above, inorganic pigments can be used if the glass component does not include sufficient coloring oxides (e.g., $Co_3O_4$, $Cr_2O_3$, $Fe_2O_3$, $MnO_2$, NiO, CuO) to provide the desired coloration in the final enamel layer and/or to provide materials that can interact with the glass component to promote the formation of titanate crystals. Examples of suitable inorganic pigments include copper chrome black sold under the trade designation K-393, iron nickel manganese chrome black sold under the trade designation V792, and iron cobalt chrome black sold under the trade designation F-6340, all sold by the Ferro Corporation of Cleveland, Ohio. When used, inorganic pigments generally account for less than about 40%, or more preferably less than about 30%, by weight of the solids portion of the enamel composition.

The solids portion of the glass enamel composition according to the invention can further comprise one or more fillers. Examples of suitable fillers include alumina ($Al_2O_3$), buss bar hiding control agents such as fine silicon powders (up to about 3% by weight), zircon, cordierite ($2MgO.2Al_2O_3.5SiO_2$), willemite ($2ZnO.SiO_2$), beta-eucryptite ($LiAlSiO_4$), transition metal oxides such as FeO and silicon dioxide ($SiO_2$). Fillers generally comprise less than about 30%, and more preferably less than 20%, by weight of the solids portion of the enamel composition.

A glass enamel composition according to the present invention may also further comprise a suitable vehicle or carrier that facilitates application of the glass enamel composition to a section of glass or other suitable substrate. Depending upon the particular application, a glass enamel composition according to the invention can be applied as a slurry, a paste, ink jet printable ink or as a thermoplastic pellet.

When used to form an opaque, dark band on a section of automobile glass, a glass enamel composition according to the invention is preferably formed by dispersing the solids portion in a suitable vehicle or carrier, which preferably comprises a solvent and a resin. Examples of potential suitable solvents include terpenes such as alpha- or beta-terpineol or mixtures thereof with other solvents such as kerosene, dibutyl phthalate, butyl carbitol, butyl carbitol acetate, hexylene glycol and high-boiling alcohols and alcohol esters. Various combinations of these and other solvents may be formulated to obtain the desired viscosity and volatility requirements for each application. Examples of potential suitable resins include ethyl cellulose, ethyl hydroxy ethyl cellulose, wood rosin, mixtures of ethyl cellulose and phenolic resins, polymethacrylates of lower alcohols and monobutyl ether of ethylene glycol monoacetate.

Optionally, the vehicle or carrier may also comprise a thixotrope and a wetting agent in order to facilitate the application of the enamel composition to the section of glass. Examples of potential suitable thixotropic agents include organic based thixotropics such as, for example, hydrogenated castor oil and derivatives thereof and ethyl cellulose. Examples of potential suitable wetting agents include fatty acid esters, for example, N-tallow-1, 3-diaminopropane di-oleate, N-tallow trimethylene diamine diacetate, N-coco trimethylene diamine, beta diamines, N-oleyl trimethylene diamine, N-tallow trimethylene diamine, and/or N-tallow trimethylene diamine di-oleate.

The glass component preferably comprises at least about 30% by weight of the solids portion. More preferably, the glass component comprises at least about 60% by weight of the solids portion. Most preferably, the glass component comprises from about 70% to about 100% by weight of the solids portion.

The glass enamel composition according to the invention is preferably applied to a section of glass by screen printing or other conventional application technique. The section of glass is then preferably heated to a temperature of from about 485° C. to about 780° C., and most preferably to about 520° C. to about 725° C., and then formed to a desired shape. Generally, the step of firing the enamel and forming or shaping the section of glass is carried out simultaneously or at substantially the same time. Such forming may be carried out utilizing a press device that may include a head covered with a material such as FIBERFRAX refractory fiber. FIBERFRAX is a registered trademark for refractory fiber owned by the Stemcor Corporation of Cleveland, Ohio.

During the forming operation, the refractory fiber contacts the applied layer of the glass enamel composition, but does not stick. Applicants believe that the crystallization of bismuth titanate, and optionally zinc titanate, that occurs during heating helps to prevent the refractory fiber from sticking to the enamel and/or causing the surface of the resultant enamel finish produced by the enamel composition from becoming disrupted or disturbed. Similarly, the vacuum head utilized to transport the glass is covered with a refractory fiber such as FIBERFRAX refractory fiber and applicants believe that the crystallization that occurs during heating helps to prevent the refractory fiber from sticking to the enamel composition and/or causing the surface of the resultant enamel finish from becoming disrupted or disturbed.

The following examples are intended only to illustrate the invention and should not be construed as imposing limitations upon the claims.

EXAMPLE 1

Glasses A through M were prepared using conventional glass making techniques such that they had the composition by weight percent shown in Table 1 below. Glasses A, B, and C do not precipitate predominantly titanate crystals and thus, when viewed alone, do not provide a glass component within the scope of the present invention. Glasses D through M, when viewed alone, do provide a glass component that is within the scope of the present invention.

TABLE 1

| Glass | Constituent (Weight Percent) | | | | | | | |
|---|---|---|---|---|---|---|---|---|
| | $SiO_2$ | $TiO_2$ | $Bi_2O_3$ | ZnO | $Li_2O$ | $K_2O$ | $B_2O_3$ | Other Oxides |
| A | 21.3 | — | 70.3 | 2.4 | 0.5 | 1.0 | — | $Nb_2O_5$-3.1 BaO-1.4 |
| B | 19.0 | — | 54.1 | 2.1 | 1.8 | — | — | $Nb_2O_5$-2.8 BaO-2.2 $MnO_2$-13.5 $Cr_2O_3$-4.5 |
| C | 21.5 | 2.4 | 70.8 | 2.4 | 0.5 | 1.0 | — | BaO-1.4 |
| D | 21.0 | 4.6 | 69.2 | 2.3 | 0.5 | 1.0 | — | BaO-1.4 |
| E | 28.2 | 12.1 | 48.4 | — | 1.6 | 4.9 | 4.8 | — |
| F | 20.2 | 20.1 | 48.4 | — | 1.6 | 4.9 | 4.8 | — |
| G | 15.9 | 8.4 | 62.8 | 5.1 | 1.1 | 3.4 | 3.3 | — |
| H | 16.8 | 8.9 | 66.5 | — | 0.6 | 3.6 | 3.6 | — |
| J | 32.1 | 23.3 | 8.8 | 24.2 | 1.4 | 4.4 | 5.8 | — |
| K | 28.3 | 19.8 | 23.1 | 18.2 | 1.2 | 4.2 | 5.2 | — |
| L | 14.6 | 7.7 | 57.5 | — | 0.6 | 3.1 | 3.0 | $Cr_2O_3$-13.5 |
| M | 16.0 | 8.5 | 63.3 | — | 0.6 | 3.4 | 3.4 | CuO-4.8 |

EXAMPLE 2

Glasses A through M from Example 1 were each milled to an average particle size of from about 2 to about 6 microns and then dispersed in C31 medium (available from Ferro Corporation of Cleveland, Ohio) and mixed in a high shear mixer for about 10 minutes. The weight ratio of the solids to medium was about 7.5. The resulting pastes were each screen printed onto 5 cm by 10 cm by 3 mm thick automobile windshield coupons (on the tin side) using a 160 mesh screen to a wet print thickness of about 1 to about 1.5 mils. The glass coatings were dried in a forced air oven at about 185° F. for about 30 minutes and then heat treated in an oven held at about 1250° F. for about 5 minutes. After cooling to room temperature (about 25° C.), X-ray diffraction patterns of the fired glass coating were taken using Cu K-alpha radiation to determine the type of crystalline materials, if any, precipitated in the glass coating during the 1250° F. heat treatment.

The results are reported in Table 2 below, where "BS" means cubic bismuth silicate ($Bi_2O_3.SiO_2$) crystals; "BT2" means cubic bismuth titanate ($Bi_2O_3.2TiO_2$) crystals; "B2T3" means orthorhombic bismuth titanate ($2Bi_2O_3.3TiO_2$) crystals; and "Z2T3" means cubic zinc titanate (2ZnO. $3TiO_2$) crystals. The fused glass coatings were also tested for chemical resistance in various solutions as reported in Table 2 as weight loss in mg per 27 cm² for the given length of time (1 to 144 hr) as noted. FIG. 1 graphically illustrates the comparative durability of glasses A through M in 0.1 N $H_2SO_4$ (1.43 pH, 86° C.) in terms of percent weight loss as a function of time.

TABLE 2

| | | Percent Weight Loss In | | | | | |
|---|---|---|---|---|---|---|---|
| Glass | Crystal Type(s) | $H_2O$ @ 80° C. 100 Hrs. | $H_2SO_4$ 0.1N 25° C. 2 Hrs. | $HNO_3$ 10% (wt) 25° C. 1 Hr. | HCl 10% (wt) 25° C. 1Hr. | Citric Acid 10% (wt) 25° C. 1 Hr. | $H_2SO_4$ 0.1 N 86° C. 144 Hrs. |
| A | BS | 3.5 | 0.8 | 1.5 | 20 | 2.7 | 100 |
| B | No Crystals Formed | 3.8 | 3.5 | 3.3 | 8.6 | 3.5 | 100 |
| C | BS | 2.0 | 1.7 | 1.8 | 26.9 | 1.7 | 96 |
| D | BT2 + BS | 3.1 | 2.5 | 7.4 | 3 | 2.5 | 82 |
| E | BT2 + B2T3 | 0.1 | 0.3 | 0.6 | 0.2 | 0.5 | <1 |
| F | BT2 + B2T3 | 0.1 | 0.1 | 0.4 | 0.3 | 0.4 | <1 |
| G | B2T3 + BT2 | 0.3 | 0.5 | 13.2 | 5 | 0.1 | 25.9 |
| H | B2T3 + BT2 | 0.1 | 0.3 | 0.3 | 0.7 | 0 | 32.7 |
| J | Z2T3 | 1.1 | 6.3 | 2.4 | 4.9 | 1 | 9.8 |
| K | Z2T3 | 1.2 | 0.4 | 0.2 | 0.1 | 0.2 | 27.2 |

TABLE 2-continued

|  |  | Percent Weight Loss In | | | | | |
|---|---|---|---|---|---|---|---|
| Glass | Crystal Type(s) | $H_2O$ @ 80° C. 100 Hrs. | $H_2SO_4$ 0.1N 25° C. 2 Hrs. | $HNO_3$ 10% (wt) 25° C. 1 Hr. | HCl 10% (wt) 25° C. 1Hr. | Citric Acid 10% (wt) 25° C. 1 Hr. | $H_2SO_4$ 0.1 N 86° C. 144 Hrs. |
| L | BT2 + B2T3 + Cr titanates | 0.2 | 0.1 | 0.1 | 0.3 | 0 | 9.0 |
| M | B2T3 | 0.1 | 0.3 | 0 | 1.1 | 0 | 50.9 |

EXAMPLE 3

Glass Enamel Compositions 1 through 5 were each formed by combining the constituents in the parts by weight shown in Table 3 below. Glasses B, H, K, L, and M were from Example 1. O-1749B Pigment is a copper manganese iron inorganic pigment, K751 Pigment is a copper chrome manganese inorganic pigment, and V792 Pigment is a nickel chrome manganese iron inorganic pigment, and C31 is an auto glass enamel medium, each of which is available from the Ferro Corporation of Cleveland, Ohio.

TABLE 3

| Constituent | Enamel 1 | Enamel 2 | Enamel 3 | Enamel 4 | Enamel 5 |
|---|---|---|---|---|---|
| O-1749B Pigment | 17.5 | — | — | — | 17.5 |
| K751 Pigment | — | 5 | 5 | 5 | — |
| V792 Pigment | — | 12.5 | 12.5 | 12.5 | — |
| Glass B | 40 | 40 | 10 | 40 | — |
| Glass H | — | — | — | — | 80 |
| Glass K | 40 | — | — | — | — |
| Glass L | — | 40 | 70 | — | — |
| Glass M | — | — | — | 40 | — |
| C31 Medium | 17.4 | 17.4 | 17.4 | 17.4 | 17.4 |

EXAMPLE 4

Glass Enamels 1 through 5 from Example 3 were each separately applied by screen printing onto 5 cm by 10 cm by 3 mm thick automobile windshield coupons (on the tin side) using a 160 mesh screen to a wet print thickness of about 1 to about 1.5 mils. These glass enamels were dried in a forced air oven at about 185° F. for about 30 minutes and then heat treated in an oven held at about 1250° F. for about 2 to 8 minutes. After the enameled coupons were cooled to room temperature (about 25° C.), the enameled coupons were subjected to the same chemical resistance testing as outlined in Example 2. The results of such testing are reported in Table 4 below.

TABLE 4

|  | Percent Weight Loss In | | | | | |
|---|---|---|---|---|---|---|
| Enamel | $H_2O$ @ 80° C. 100 Hrs. | $H_2SO_4$ 0.1N 25° C. 2 Hrs. | $HNO_3$ 10% (wt) 25° C. 1 Hr. | HCl 10% (wt) 25° C. 1Hr. | Citric Acid 10% (wt) 25° C. 1 Hr. | $H_2SO_4$ 0.1 N 86° C. 144 Hrs. |
| 1 | 18.3 | 14.1 | 3.6 | 3.1 | 9.1 | 34.8 |
| 2 | 7.2 | 3.7 | 1.9 | 1.4 | 1.1 | 68.0 |
| 3 | 7.0 | 3.8 | 3.5 | 1.7 | 3.1 | 21.9 |
| 4 | 2.2 | 0.5 | 1.8 | 5.5 | 0.3 | 100 |
| 5 | 1.9 | 2.9 | 6.0 | 0.7 | 1.4 | 37.1 |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A lead-free and cadmium-free glass enamel composition comprising a solids portion, the solids portion comprising:
   a glass component, the glass component comprising:
      from about 11% to about 52% by weight $SiO_2$;
      from 10.2% to about 40% by weight $TiO_2$;
      from about 30% to about 85% by weight $Bi_2O_3$+ZnO, provided the $Bi_2O_3$ comprises from about 5% to about 75% of the glass component by weight and the ZnO comprises up to about 45% of the glass component by weight;
      up to about 8% by weight $B_2O_3$; and
      up to about 14% by weight BaO+SrO.

2. The lead-free and cadmium-free glass enamel composition according to claim 1 wherein the glass component comprises:
   from about 14% to about 35% by weight $SiO_2$;
   from about 11% to about 35% by weight $TiO_2$;
   from about 33% to about 74% by weight $Bi_2O_3$+ZnO, provided the $Bi_2O_3$ comprises from about 8% to about 74% of the glass component by weight and the ZnO comprises up to about 35% of the glass component by weight;
   up to about 6% by weight $B_2O_3$; and
   up to about 10% by weight BaO+SrO.

3. The lead-free and cadmium-free glass enamel composition according to claim 1 wherein the glass component further comprises up to a total of 35% by weight of one or more optional oxides selected from the group consisting of:
   alkali metal oxides, provided the sum of all alkali metal oxides comprises less than about 25% of the glass component by weight;
   alkaline-earth metal oxides, provided the sum of all alkaline-earth metal oxides comprises less than about 25% of the glass component by weight;
   $La_2O_3$, $Y_2O_3$, $Nb_2O_5$, and $ZrO_2$, provided the sum of all $La_2O_3$, $Y_2O_3$, $Nb_2O_5$, and $ZrO_2$ comprises less than about 25% of the glass component by weight;
   $Cr_2O_3$, $Fe_2O_3$, $MnO_2$, CuO, NiO, $Co_2O_3$, and $CeO_2$, provided the sum of all $Cr_2O_3$, $Fe_2O_3$, $MnO_2$, CuO, NiO, $Co_2O_3$, and $CeO_2$ comprises less than about 30% of the glass component by weight;
   SnO, $In_2O_3$, and $MoO_3$, provided the sum of all SnO, $In_2O_3$, and $MoO_3$ comprises less than about 20% of the glass component by weight;

$Al_2O_3$, provided the $Al_2O_3$ comprises less than about 15% of the glass component by weight;

$V_2O_5$, provided the $V_2O_5$ comprises less than about 25% of the glass component by weight; and $Sb_2O_3$, provided the $Sb_2O_3$ comprises less than about 15% of the glass component by weight.

4. The lead-free and cadmium-free glass enamel composition according to claim 2 wherein the glass component further comprises from about 0.1% to about 30% by weight of one or more optional oxides selected from the group consisting of:

alkali metal oxides, provided the sum of all alkali metal oxides comprises less than about 13% of the glass component by weight;

alkaline-earth metal oxides, provided the sum of all alkaline-earth metal oxides comprises less than about 20% of the glass component by weight;

$La_2O_3$, $Y_2O_3$, $Nb_2O_5$, and $ZrO_2$, provided the sum of all $La_2O_3$, $Y_2O_3$, $Nb_2O_5$, and $ZrO_2$ comprises less than about 20% of the glass component by weight;

$Cr_2O_3$, $Fe_2O_3$, $MnO_2$, CuO, NiO, $Co_2O_3$, and $CeO_2$, provided the sum of all $Cr_2O_3$, $Fe_2O_3$, $MnO_2$, CuO, NiO, $Co_2O_3$, and $CeO_2$ comprises less than about 25% of the glass component by weight;

SnO, $In_2O_3$, and $MoO_3$, provided the sum of all SnO, $In_2O_3$, and $MoO_3$ comprises less than about 15% of the glass component by weight;

$Al_2O_3$, provided the $Al_2O_3$ comprises less than about 15% of the glass component by weight;

$V_2O_5$, provided the $V_2O_5$ comprises less than about 25% of the glass component by weight; and $Sb_2O_3$, provided the $Sb_2O_3$ comprises less than about 15% of the glass component by weight.

5. The lead-free and cadmium-free glass enamel composition according to claim 1 wherein the solids portion further comprises one or more selected from the group consisting of inorganic pigments, fillers, and seeds for titanate crystals.

6. The lead-free and cadmium-free glass enamel composition according to claim 1 wherein the glass component comprises a combination of two or more glass frits.

7. The lead-free and cadmium-free glass enamel composition according to claim 1 wherein the composition upon firing at a temperature of from about 485° C. to 780° C. forms an enamel layer comprising crystals dispersed in a residual glass, wherein a predominant portion of the crystals comprise bismuth titanate.

8. The lead-free and cadmium-free glass enamel composition according to claim 7 wherein less than about 70% by weight of the enamel layer is removed upon exposure to an 86° C. 0.1 N $H_2SO_4$ solution for 144 hours.

9. A lead-free and cadmium-free glass enamel composition comprising a solids portion, the solids portion comprising:

a glass component, the glass component comprising:
from about 11% to about 52% by weight $SiO_2$;
from 3.4% to about 40% by weight $TiO_2$;
from about 30% to about 85% by weight $Bi_2O_3$+ZnO, provided the $Bi_2O_3$ comprises from about 5% to about 75% of the glass component by weight and the ZnO comprises up to about 45% of the glass component by weight;
up to about 8% by weight $B_2O_3$;
up to about 14% by weight BaO+SrO; and
from about 0.1% to about 30% of any one or a combination of coloring oxides selected from the group consisting of $Cr_2O_3$, $Fe_2O_3$, $MnO_2$, CuO, NiO, $Co_2O_3$, and $CeO_2$.

10. The lead-free and cadmium-free glass enamel composition according to claim 9 wherein the glass component comprises:

from about 14% to about 35% by weight $SiO_2$;
from about 5% to about 35% by weight $TiO_2$;
from about 33% to about 74% by weight $Bi_2O_3$+ZnO, provided the $Bi_2O_3$ comprises from about 8% to about 74% of the glass component by weight and the ZnO comprises up to about 35% of the glass component by weight;
up to about 6% by weight $B_2O_3$;
up to about 10% by weight BaO+SrO; and
from about 0.5% to about 25% of any one or a combination of coloring oxides selected from the group consisting of $Cr_2O_3$, $Fe_2O_3$, $MnO_2$, CuO, NiO, $Co_2O_3$, and $CeO_2$.

11. The lead-free and cadmium-free glass enamel composition according to claim 9 wherein the glass component further comprises up to a total of 35% by weight of one or more optional oxides selected from the group consisting of:

alkali metal oxides, provided the sum of all alkali metal oxides comprises less than about 25% of the glass component by weight;

alkaline-earth metal oxides, provided the sum of all alkaline-earth metal oxides comprises less than about 25% of the glass component by weight;

$La_2O_3$, $Y_2O_3$, $Nb_2O_5$, and $ZrO_2$, provided the sum of all $La_2O_3$, $Y_2O_3$, $Nb_2$ $O_5$, and $ZrO_2$ comprises less than about 25% of the glass component by weight;

SnO, $In_2O_3$, and $MoO_3$, provided the sum of all SnO, $In_2O_3$, and $MoO_3$ comprises less than about 20% of the glass component by weight;

$Al_2O_3$, provided the $Al_2O_3$ comprises less than about 15% of the glass component by weight;

$V_2O_5$, provided the $V_2O_5$ comprises less than about 25% of the glass component by weight; and $Sb_2O_3$, provided the $Sb_2O_3$ comprises less than about 15% of the glass component by weight.

12. The lead-free and cadmium-free glass enamel composition according to claim 10 wherein the glass component further comprises from about 0.1% to about 30% by weight of one or more optional oxides selected from the group consisting of:

alkali metal oxides, provided the sum of all alkali metal oxides comprises less than about 13% of the glass component by weight;

alkaline-earth metal oxides, provided the sum of all alkaline-earth metal oxides comprises less than about 20% of the glass component by weight;

$La_2O_3$, $Y_2O_3$, $Nb_2O_5$, and $ZrO_2$, provided the sum of all $La_2O_3$, $Y_2O_3$, $Nb_2O_5$, and $ZrO_2$ comprises less than about 20% of the glass component by weight;

SnO, $In_2O_3$, and $MoO_3$, provided the sum of all SnO, $In_2O_3$, and $MoO_3$ comprises less than about 15% of the glass component by weight;

$Al_2O_3$, provided the $Al_2O_3$ comprises less than about 15% of the glass component by weight;

$V_2O_5$, provided the $V_2O_5$ comprises less than about 25% of the glass component by weight; and $Sb_2O_3$, provided the $Sb_2O_3$ comprises less than about 15% of the glass component by weight.

13. The lead-free and cadmium-free glass enamel composition according to claim 9 wherein the solids portion further comprises one or more selected from the group consisting of inorganic pigments, fillers, and seeds for titanate crystals.

14. The lead-free and cadmium-free glass enamel composition according to claim 9 wherein the glass component comprises a combination of two or more glass frits.

15. The lead-free and cadmium-free glass enamel composition according to claim 9 wherein the composition upon firing at a temperature of from about 485° C. to 780° C. forms an enamel layer comprising crystals dispersed in a residual glass, wherein a predominant portion of the crystals comprise bismuth titanate.

16. The lead-free and cadmium-free glass enamel composition according to claim 15 wherein less than about 70% by weight of the enamel layer is removed upon exposure to an 86° C. 0.1 N $H_2SO_4$ solution for 144 hours.

17. A lead-free and cadmium-free glass enamel composition comprising a solids portion, the solids portion comprising:

a glass component, the glass component comprising from about 50% to about 90% by weight of one or more first glass frits that form titanate crystals upon firing and from about 10% to about 50% by weight of one or more second glass frits that do not form titanate crystals upon firing, provided that the glass frits in the glass component collectively comprises:

from about 11% to about 52% $SiO_2$ by weight of the glass component;

from 3.4% to about 40% $TiO_2$ by weight of the glass component;

from about 30% to about 85% $Bi_2O_3$+ZnO by weight of the glass component, provided the $Bi_2O_3$ comprises from about 5% to about 75% of the glass component by weight and the ZnO comprises up to about 45% of the glass component by weight;

up to about 8% $B_2O_3$ by weight of the glass component; and up to about 14% BaO+SrO by weight of the glass component.

18. The lead-free and cadmium-free glass enamel composition according to claim 17 wherein the composition upon firing at a temperature of from about 485° C. to 780° C. forms an enamel layer comprising crystals dispersed in a residual glass, wherein a predominant portion of the crystals comprise bismuth titanate.

19. The lead-free and cadmium-free glass enamel composition according to claim 17 wherein the glass frits in the glass component collectively comprise:

from about 14% to about 35% $SiO_2$ by weight of the glass component;

from about 5% to about 35% $TiO_2$ by weight of the glass component;

from about 33% to about 74% $Bi_2O_3$+ZnO by weight of the glass component, provided the $Bi_2O_3$ comprises from about 8% to about 74% of the glass component by weight and the ZnO comprises up to about 35% of the glass component by weight;

up to about 6% $B_2O_3$ by weight of the glass component; and up to about 10% BaO+SrO by weight of the glass component.

20. The lead-free and cadmium-free glass enamel composition according to claim 17 wherein the glass frits in the glass component further collectively comprises up to a total of 35% by weight of the glass component of one or more optional oxides selected from the group consisting of:

alkali metal oxides, provided the sum of all alkali metal oxides comprises less than about 25% of the glass component by weight;

alkaline-earth metal oxides, provided the sum of all alkaline-earth metal oxides comprises less than about 25% of the glass component by weight;

$La_2O_3$, $Y_2O_3$, $Nb_2O_5$, and $ZrO_2$, provided the sum of all $La_2O_3$, $Y_2O_3$, $Nb_2O_5$, and $ZrO_2$ comprises less than about 25% of the glass component by weight;

$Cr_2O_3$, $Fe_2O_3$, $MnO_2$, CuO, NiO, $Co_2O_3$, and $CeO_2$, provided the sum of all $Cr_2O_3$, $Fe_2O_3$, $MnO_2$, CuO, NiO, $Co_2O_3$, and $CeO_2$ comprises less than about 30% of the glass component by weight;

SnO, $In_2O_3$, and $MoO_3$, provided the sum of all SnO, $In_2O_3$, and $MoO_3$ comprises less than about 20% of the glass component by weight;

$Al_2O_3$, provided the $Al_2O_3$ comprises less than about 15% of the glass component by weight;

$V_2O_5$, provided the $V_2O_5$ comprises less than about 25% of the glass component by weight; and $Sb_2O_3$, provided the $Sb_2O_3$ comprises less than about 15% of the glass component by weight.

21. The lead-free and cadmium-free glass enamel composition according to claim 17 wherein said solids portion further comprises one or more selected from the group consisting of inorganic pigments, fillers, and seeds for titanate crystals.

22. A section of glass having a lead-free and cadmium-free glass enamel composition according to claim 17 fused thereon at a temperature of from about 485° C. to 780° C. to form an enamel layer, the enamel layer comprising bismuth titanate crystals and optionally zinc titanate crystals dispersed in a residual glass comprising $SiO_2$, wherein less than about 70% by weight of the glass enamel coating layer is removed upon exposure to an 86° C. 0.1 N $H_2SO_4$ solution for 144 hours.

* * * * *